United States Patent Office 2,953,538
Patented Sept. 20, 1960

2,953,538
PROCESS OF SPINNING ACRYLONITRILE POLYMER SOLUTION IN A MIXTURE OF SOLVENTS

Donald Joseph Lyman, Wilmington, Del., assignor to E. I. du Pont de Nemours and Company, Wilmington, Del., a corporation of Delaware No Drawing. Filed Oct. 18, 1957, Ser. No. 690,888

4 Claims. (Cl. 260—30.2)

This invention relates to a novel spinning solution and to shaped articles produced therefrom. More particularly, this invention relates to organic solvent solutions of polymers of acrylonitrile in which at least about 85% by weight of the polymer is combined acrylonitrile and to the production of shaped articles from the organic solvent solutions of said polymers of acrylonitrile.

Polymers of acrylonitrile containing at least 85% by weight combined acrylonitrile are well-known fiber-forming materials. Such polymers, however, are difficult and expensive to form into fibers because of their slight solubility in most organic solvents. This necessitates the use of unusual and costly solvents, such as N,N-dimethylformamide, N,N-dimethylacetamide, N-methylpyrrolidone, dimethylsulfoxide and others. Indeed, the commercial production of fibers from acrylonitrile polymers had to wait many years for the discovery of practical solvents. In addition to being costly, these solvents have the disadvantage of having high-boiling points, so that spinning processes, especially dry spinning, must be conducted at elevated temperature, thereby adding appreciably to the cost of manufacture. The use of such high temperatures also increases the difficulty of obtaining white fibers from such solutions, because such polymers discolor upon the application of excessive heat.

An object of this invention is to provide more economical spinning or casting solutions from acrylonitrile polymers. A further object is to provide solutions of acrylonitrile polymers that can be spun or cast into shaped articles at appreciably lower temperatures than is now possible with the solvents of the prior art. Another object is to provide solutions of acrylonitrile polymers from which shaped articles having greatly improved color characteristics may be obtained.

The objects of this invention are attained by dissolving a polymer of acrylonitrile containing at least about 85% by weight combined acrylonitrile in a solvent medium comprising from about 20% to about 30% by volume of an aliphatic ketone having a boiling point no greater than about 150° C. and preferably no greater than 120° C., and a solvent from the class consisting of N,N-dimethylformamide, N,N-dimethylacetamide, and N-methylpyrrolidone, to form a solution containing at least about 10% by weight of the acrylonitrile polymer.

The expression "intrinsic viscosity" with the symbol (N) as used herein signifies the value of ln $N_r$ at the ordinate axis intercept (i.e., when $c$ equals 0) in a graph of $$\frac{\ln N_r}{c}$$

as ordinate with $c$ values (grams per 100 ml. of solution) as abscissas. $N_r$ is a symbol for relative viscosity, which is the ratio of the flow times in a viscosimeter of a polymer solution and the solvent. The symbol (ln) is the logarithm to the base $e$. All viscosity measurements on polymers containing acrylonitrile are made with N,N-dimethylformamide solutions at 25° C.

EXAMPLE I

N,N-dimethylformamide in the amount of 35 ml. is added to 15 ml. of 4-methyl pentanone-2. This mixture, in the amount of 4 ml. is mixed with 0.5 gram of a copolymer of acrylonitrile, methyl acrylate, and sodium styrene sulfonate (93.65/5.98/0.37% by weight) having an intrinsic viscosity of 1.5. The resulting white, slightly viscous slurry (12.4% polymer) is stirred at room temperature, heated to a temperature of 50° C. on a hot plate, and then cast onto a glass plate and levelled by means of a doctor blade.

After 15–30 minutes at room temperature, the cast solution is stripped from the plate and air dried overnight to yield a clear tough film. Another film is cast from a 12.4% solution of the same polymer in dimethylformamide alone. This film cannot be removed from the plate after 30 minutes, and so heating on a steam table is used to dry the film sufficiently for removal.

EXAMPLE II

N,N-dimethylacetamide in the amount of 40 ml. is added to 10 ml. of 4-methyl pentanone-2. The copolymer of Example I in the amount of 1 gram is added to 4 ml. of this mixture. The resulting white, slightly viscous slurry is treated in the same manner as the slurry of Example I to form a clear tough film readily removable from the film-forming plate.

EXAMPLE III

N-methylpyrrolidone in the amount of 40 ml. is added to 10 ml. of 4-methylpentanone-2. The copolymer of Example I in the amount of 1 gram is added to 4 ml. of this mixture. The resulting white, slightly viscous slurry is treated in the same manner as the slurry of Example I to form a clear tough film which is readily removed from the film-forming plate.

EXAMPLE IV

Dimethylformamide in the amount of 70 ml. is added to 30 ml. of methyl ethyl ketone. To this mixture is added 14 grams of the polymer of Example I to form a clear viscous solution containing 12.4% of the polymer. This solution is then cast onto a glass plate and smoothed with a doctor blade. After 15–30 minutes at room temperature, the cast solution is stripped from the glass plate and air dried overnight to yield a clear tough film. Similar results are attained when the N,N-dimethylformamide is replaced by N,N-dimethylacetamide and N-methylpyrrolidone. This same procedure is followed using 14 grams of the copolymer of Example I and 100 ml. of N,N-dimethylformamide alone instead of the N,N-dimethylformamide-acetone mixture. The resulting solution is cast onto a glass plate and levelled by means of a doctor blade. After 30 minutes, the film cannot be removed and is heated on a steam table to dry the film sufficiently for removal.

It is quite surprising that known solvents for polyacrylonitrile, i.e., N,N-dimethylformamide, N-methylpyrrolidone, and N,N-dimethylacetamide, can be diluted with as much as 30% by volume of compounds that are non-solvents for polyacrylonitrile and still afford very excellent solutions of the polymers which are superior in some respects to solutions of the acrylonitrile polymer in the undiluted solvents.

EXAMPLE V

The copolymer of Example I in the amount of 70 grams is added to a mixture of 224 ml. dimethylformamide and 56 ml. acetone. The resulting white, slightly viscous slurry is then stirred and heated from room temperature to 45–50° C. The resulting clear viscous solution has a viscosity of 80–90 poises at the head temperature of 75° C. This solution is then dry spun using an apparatus similar to that shown in U.S. Patent 2,615,198, issued to G. N. Flannagan in a spinning cell about 6 inches in diameter by 11 feet in length. The spinneret contained 10 orifices 0.005 inch in diameter.

The spinning conditions used and results are shown in Table I in comparison with results obtained using a similar dimethylformamide solution. The head temperature is the temperature of the spinning solution just before being extruded; the spinneret temperature is the surface temperature of the spinneret where it protrudes into the cell; the air temperature is the temperature of the air as it enters the top of the spinning cell around the spinneret at a rate of about 4 to 6 cubic feet per minute; the cell temperature is the inside surface temperature of the electrically heated spinning cell.

Table I

| Solvent system | N,N-dimethyl-formamide | N,N-dimethyl-formamide/ acetone |
|---|---|---|
| Percent solids | 26.7 | 20 |
| head temperature °C | 116 | 75 |
| spinneret temperature °C | 110 | 87 |
| air temperature °C | 120 | 120 |
| column temperature °C | 150 | 150 |
| yarn wind-up speed in yards per minute | 133 | 127 |
| residual solvent content of yarn | 23.6 | 19.8 |
| denier after 8X draw | 1.4 | 1.1 |

Different contents of solids are used in order that both solutions have the same viscosity when extruded. It is known that the spinning performance of a solution is very sensitive to its viscosity. Both solutions spin well. Similar results are attained when N,N-dimethylacetamide and N-methylpyrrolidone are substituted for the N,N-dimethylforamide in the acetone mixture.

It is surprising that yarn with a lower residual solvent content can be obtained by spinning with a mixed solvent at lower temperatures even though that solution contained a significantly higher amount of liquids than the solution with N,N-dimethylformamide alone.

The fibers prepared above are drawn 8X (i.e., to a length 8 times the original length) in steam under pressure of 10 pounds per square inch, the solvents being recovered from the steam cell condensate. The drawn filaments are then air dried at 70° F. in 65% relative humidity. The tenacities at the break in grams per denier are 4.4 and 4.5, respectively, for the yarn spun from N,N-dimethylformamide solution and from the N,N-dimethylformamide/acetone mixture, respectively. Elongations at the break are 27 and 25%, respectively. Initial modulus values (grams per denier) are 55 and 61, respectively. The fibers from the mixed solvent solutions are whiter (i.e., less yellow) than the fibers spun from N,N-dimethylformamide alone. Thus, spinning with a mixed solvent permits spinning at a commercial level at much lower temperatures than normal and still give first quality yarn.

It is very surprising that fibers spun from the mixed solvent are free from bubbles, even though the spinning temperatures are well above the boiling point of the diluent.

EXAMPLE VI

The copolymer of Example I is made into a spinning solution containing 25% solids with a mixture of N,N-dimethylformamide/acetone 80/20 parts per volume and also with undiluated N,N-dimethylformamide. The two solutions are spun from a spinneret containing 30 orifices of 0.14 mm. in diameter under the following conditions:

Table II

| Solvent system | N,N-dimethyl-formamide | N,N-dimethyl-formamide/ acetone |
|---|---|---|
| Solution temperature °C | 135 | 105 |
| Cell temperature °C | 200 | 200 |
| Yarn wind-up speed (y.p.m.) | 300 | 300 |
| Residual solvent percent | 38 | 29 |

The as-spun yarn of 10.8 denier per filament is hand-cut into staple and the staple scoured at 80° C. for 30 minutes in deionized water containing 0.1% of a non-ionic surface-active agent, such as a polyethylene oxide-alkylphenol condensation product (Igepal CA made by General Aniline and Film Corp.). Samples are then rinsed twice in deionized water, squeezed to remove excess water, and allowed to dry at room temperature. A portion of the prepared dry sample weighing about two grams is carded by means of a hand card to parallelize the fibers, giving a pad of staple fibers of about 3 x 6" which is folded once lengthwise. The reflectance ratios of the samples at the "green" and "blue" setting of the instrument are measured, using a Model IV Colormaster Differential Colorimeter made by Manufacturing, Engineering and Equipment Company of Hatboro, Pennsylvania, calibrated against the manufacturer's standard reflectance plates and National Bureau of Standards' certified reflectance plates. Two readings are taken on each side of the sample, the second measurement being made with the sample rotated 90° from the position of the first reading. The tristimulus values obtained from the instrument are converted into other values which are the rectangular co-ordinates of a visually uniform color space (a modification of the proposal by E. Q. Adams in J. Optical Soc. Am. 32, 168–73 (1942)). The lightness co-ordinate, "L," corresponds to the Munsel co-ordinate of lightness, i.e., a value of 0 corresponds to a pure black, and a value of 100 indicates that all light is reflected. A positive value of "b" indicates the extent of yellow in the color while a "b" value of 0 indicates no yellow and a negative "b" value indicates a blue shade. The "b" and "L" dimensions are the National Bureau of Standards' unit of color difference.

Table III

| Yarn | "b" value | "L" |
|---|---|---|
| a. from mixed solvent | 5.0 | 91.0 |
| b. from N,N-dimethylformamide alone | 6.7 | 89.92 |
| c. from mixed solvent delustered yarn | 3.8 | 93.94 |
| d. from N,N-dimethylformamide alone delustered yarn | 6.1 | 92.90 |

Item C was prepared as above from N,N-dimethylformamide/acetone, the solution containing 0.4% titanium dioxide, based on polymer, to give a delustered yarn.

Item D represents the color values of a typical commercial yarn of polyacrylonitrile, also delustered, but spun from a solution containing N,N-dimethylformamide alone.

All yarns had equivalent physical properties.

Similar improvements are attained when the N,N-dimethylformamide is replaced by N-methylpyrrolidone and N,N-dimethylacetamide in the solvent mixture.

EXAMPLE VII

The copolymer of Example I is made into a spinning solution containing 16% polymer with a mixture of N,N-dimethylformamide/acetone, 72/28 parts per volume. The solution, at room temperature, is extruded through a spinneret having 40 holes of 0.15 mm. diameter into a mixture of acetone/N,N-dimethylformamide/water, 80/10/10 parts by weight, the yarn being wound up at 10 y.p.m. It is very surprising that the as-spun yarn is very bright and lustrous, as wet-spun yarns of acrylonitrile polymers are normally dull and delustered due to the presence of voids in the fiber. Microscopic examination of the cross section shows the absence of the usual large voids.

In a second spin of the above solution, the as-spun yarn, after coagulation in the above bath, is then run through a water bath at 50° C. to give yarns of similar bright appearance. The yarn is stored for three weeks in polyethylene bags and then drawn to a length six times its original length in 95° water. After a boil-off in water, the yarn has a tenacity of 1.6 grams per denier and an elongation of 43%.

Although the invention is illustrated with the use of one particular copolymer of acrylonitrile, similar, results are obtained with acrylonitrile homopolymer and other copolymers. Numerous monomers, including ethylenically unsaturated sulfonic acids, such as the methallyl sulfonic acids and others disclosed in U.S. Patent 2,527,- 300, can be copolymerized with acrylonitrile as disclosed in Jacobson U.S. 2,436,926 and in Arnold U.S. 2,456,360 using the techniques of U.S. Patents 2,628,223 and 2,546,238. The homopolymers and copolymers of acrylonitrile containing 85% or more of combined acrylonitrile and of a molecular weight suitable for the formation of textile fibers; i.e., a molecular weight corresponding to an inherent viscosity of at least about 1.0, are characterized by their relative insolubility in common solvents. It is to these polymers that the present invention pertains.

Any ketone having a boiling point between 40 and 150° C. and preferably 50 and 120° C. which is miscible with N,N-dimethylformamide, N,N-dimethylacetamide, or N-methyl-pyrrolidone to give a solution of the polymer can be used in this invention. Suitable solutions contain from about 20% to about 30% by volume of the ketone. Such added nonsolvents, of course, should be chemically inert towards the polymer and towards the solvent and preferably should be non-toxic for purposes of safe commercial production of fibers and films.

Suitable ketones include acetone, methyl ethyl ketone, 4-methyl pentanone-2, 2-methyl-butanone-3, 2,2-dimethyl butanone-3, pentanone-3, 2-methyl-pentanone-3, 3-methyl-pentanone-2, 2,4-dimethyl-pentanone-3, 2,2-dimethyl-petanone-3, hexanone-3, and hexanone-2, to mention a few.

Solutions of polymers of acrylonitrile formed by the mixed solvents of this invention are stable at room temperature (approximately 20° C.) and at temperatures considerably above room temperature. Shaped structures and articles can be produced by extruding such solutions into an evaporative or coagulative medium. Although the compositions of matter of this invention are particularly valuable in dry spinning where the lower spinning temperatures and/or faster spinning speeds provide a more economical process, it will be understood that they also can be used in wet spinning where the lower cost of the solvent renders the use of such mixed solvents desirable.

Use of a diluent miscible with the polymer solvent but immiscible with a wet-spinning coagulant, e.g., N,N-dimethylformamide/2,4-dimethyl-pentanone-3 into water, is useful for controlling the rate of diffusion of a coagulant into wet-spun filaments and hence for controlling the fiber properties.

The solutions are prepared by dissolving the polymers of acrylonitrile with the mixed solvents of this invention. Shaped articles obtained from solvent solutions of polymers of acrylonitrile in accordance with this invention and from which the solvent is substantially removed are substantially free of foreign matter and bubbles and substantially undecomposed and chemically unchanged from the polymer prior to its solution.

The solution of acrylonitrile polymer dissolved in the mixed solvents of this invention must be of such a concentration that is viscosity at the operating temperature is within a workable range. When it is to be employed in the spinning of yarn or in the casting of film, the solution should preferably have a viscosity within the range of 25 to 750 poises. Generally, it is preferred that the spinning solution contain at least 10% of the polymer because of the difficulty in rapidly removing large amounts of solvent from the solution of the spinning operation. Moreover, it is economically undesirable to use such large amounts of solvent for the spinning of a given amount of polymer, although it is true that the solvent can be completely recovered from the spinning operation and re-used. For these reasons, it is preferred to employ a polymer having an intrinsic viscosity between about 1.0 and about 2.0, since such a polymer forms a solution of the desired viscosity in concentrations of the acrylonitrile polymer from about 15 to about 35% at a spinning temperature (i.e., head temperature) of from about 50 to about 175° C. Of course, it is within the scope of this invention to heat the solution to a higher temperature for the actual spinning operation. Here again, the controlling factor with regard to the temperature of the spinning solution is the viscosity of the solution.

Fibers spun from the compositions of matter of this invention are useful in all applications where high tensile strength and durability to weather, ultraviolet light, moisture, and heat are desirable.

The claimed invention is:

1. Process comprising the steps of admixing at least 10% by weight of a polymer of acrylonitrile containing at least about 85% by weight combined acrylonitrile, in a medium comprising (1) a solvent from the class consisting of N,N-dimethylformamide, N,N-dimethylacetamide, and N-methylpyrrolidone, and (2) from about 20% to about 30% by volume of the solvent medium of an aliphatic ketone having a boiling point of less than about 150° C. and dissolving all of said polymer in the solvent medium by heating the mixture to form a solution containing at least about 10% by weight of the acrlonitrile polymer and having a viscosity between about 25 and about 750 poises and spinning the solution into a filament at a temperature substantially less than that required for spinning a solution of the same acrylonitrile polymer in the same solvent alone and having substantially the same viscosity as the solution of the polymer in the mixed solvent medium.

2. Process comprising the stpes of dissolving a polymer of acryonitrile containing at least about 85% by weight combined acrylonitrile, in a medium comprising (1) a solvent from the class consisting of N,N-dimethylformamide, N,N-dimethylacetamide, and N-methylpyrrolidone, and (2) from about 20% to about 30% by volume of the solvent medium of an aliphatic ketone having a boiling point of less than about 150° C., to form a solution comprising at least about 10% by weight of the acrylonitrile polymer and having a viscosity between about 25 and about 750 poises and, at a spinneret temperature of from about 50° C. to about 175° C., spinning the solution into filaments, said temperature being at least about 30° less than the temperature required for a solution of the same acrylonitrile polymer in the same solvent alone and having substantially the same viscosity as the solution of the polymer in the mixed solvent medium.

3. Process comprising the steps of dissolving a polymer of acrylonitrile containing at least about 85% by weight combined acryonitrile, in a medium comprising (1) a solvent from the class consisting of N,N-dimethylformamide, N,N-dimethylacetamide, and N-methylpyrrolidone, and (2) from about 20% to about 30% by volume of the solvent medium of an aliphatic ketone having a boiling point of less than about 150° C., to form a solution containing at least about 10% by weight of the acrylonitrile polymer and having a viscosity between about 25 and about 750 poises and spinning the solution into filaments at a temperature in excess of the boiling point of the aliphatic ketone, said temperature being at least 30° less than that required for spinning a solution of the same acrylonitrile polymer in the same solvent alone and having substantially the same viscosity as the solution of the polymer in the mixed solvent medium.

4. The process of claim 3 wherein the solution contains from about 15% to about 35% by weight of acrylonitrile polymer.

References Cited in the file of this patent

UNITED STATES PATENTS 2,776,947     Schildknecht _____ Jan. 8, 1957